3,531,922
TRIMMER AND EDGER ATTACHMENT FOR A POWER MOWER
Louis H. Hansen, 6703 NW. 31 Terrace,
Bethany, Okla. 73008
Filed June 20, 1968, Ser. No. 738,466
Int. Cl. A01d 35/26
U.S. Cl. 56—25.4                                    4 Claims

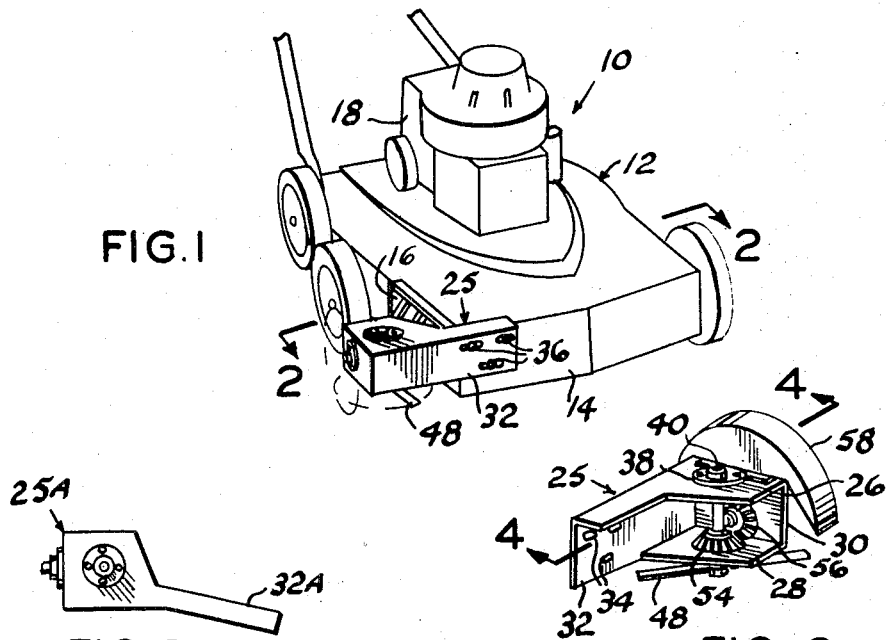
FIG. 1
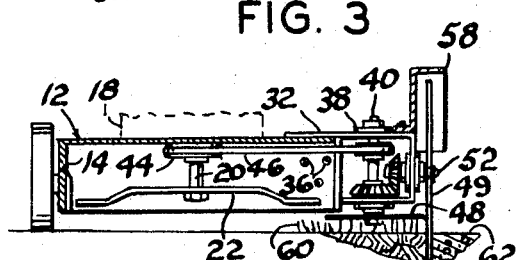
FIG. 3
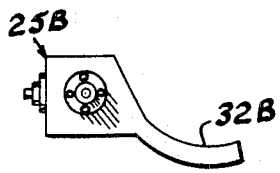
FIG. 5
FIG. 6
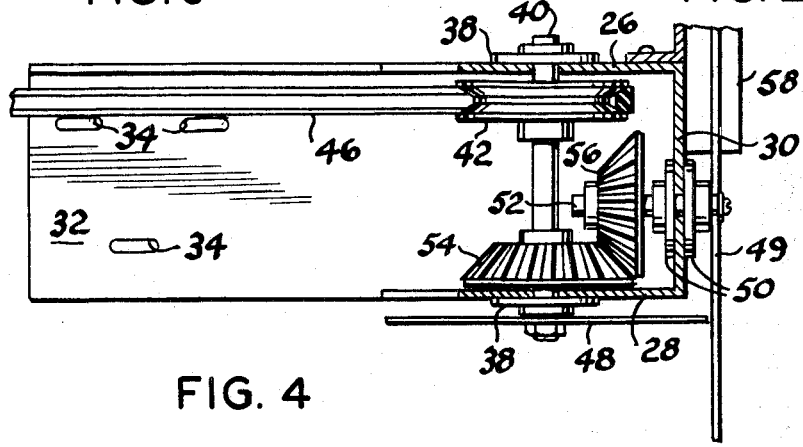
FIG. 2
FIG. 4
LOUIS H. HANSEN
*INVENTOR.*
BY
*Robert K. Rhea*
AGENT 
United States Patent Office 3,531,922
Patented Oct. 6, 1970

ABSTRACT OF THE DISCLOSURE

In a lawn edging and trimming device, a bracket and bearings for journalling vertical and horizontal blade supporting shafts with beveled gears interconnecting the shafts. The bracket is connected with the forward end of a rotary mower adjacent the cut grass exhaust port. The vertical shaft is driven by a belt from the drive shaft of the mower.

BACKGROUND OF THE INVENTION

This invention relates to lawn trimming equipment and more particularly to a trimming and edging attachment for a rotary type power lawnmower.

Rotary power lawnmowers are characterized by a wheel mounted frame or carriage supporting a motor driving a vertical shaft transmitting rotative force to a horizontally rotating cutting blade. The carriage includes a peripheral skirt to shield the operator from spraying grass or debris encountered on the lawn and a handle for operating the mower. These rotary mowers are usually provided with a lateral forwardly disposed opening in the skirt through which the cut grass is vented. It is well understood that a relatively small horizontally rotating blade makes an excellent trimmer for lawn edges and that a small blade rotated in a vertical plane makes an excellent edger for severing overgrowth of grass from the edges of sidewalks, curbs, flower beds, or the like, but this usually requires a separate motor driven unit. The expense of this separate unit has been a deterrent in the commercial success of edgers.

Various types of power mower attachment edgers have been proposed, as shown by the following patents: No. 2,771,730; 3,053,035; 3,183,652; 3,191,368 and 3,192,-693. Each of these patents requires considerable modification of the existing mower, as well as numerous components, thus approaching the cost of a separate edger and trimmer unit.

This invention, on the other hand, is formed of relatively few readily available components with the exception of its mounting bracket and, furthermore, provides both lawn trimming and edging blades powered by the rotary mower. The mower attachment of this invention is easily connected with various types of existing mowers with minor modification of the mower consisting of drilling three holes in the mower skirt and the placing of a pulley on the vertical blade equipped shaft of the mower.

SUMMARY OF THE INVENTION

A substantially U-shaped bracket, having parallel horizontally disposed legs, is connected by an extension of the bracket to the forward limit of the rotary mower frame or skirt adjacent the cut grass vent. The horizontal legs of the bracket have bearings which journal a vertical shaft having a pulley aligned with a pulley mounted on the drive shaft of the rotary mower and driven by a belt. The depending end of the vertical shaft supports a horizontally rotating lawn edging blade laterally of the mower frame. The bight portion of the U-shaped bracket is equipped with bearings which horizontally journal a stub shaft which supports an edging blade for rotation in a vertical plane. The stub shaft is connected to the vertical shaft by beveled gears.

The principal object of this invention is to provide a lawn edging and trimming device which may be relatively easily connected with and driven by existing rotary power mowers.

BRIEF DESCRIPTION OF THE DRAWINGS

FIG. 1 is a perspective view of the device, with the edger guard removed, mounted on a conventional rotary mower, shown in outline;

FIG. 2 is a vertical cross-sectional view, partially in elevation, taken substantially along the line 2—2 of FIG. 1;

FIG. 3 is a perspective view of the edger and trimmer, per se;

FIG. 4 is a vertical cross-sectional view, partially in elevation, taken substantially along the line 4—4 of FIG. 3; and FIGS. 5 and 6 are top plan views of alternative embodiments of the edger and trimmer with the edger guard removed.

DESCRIPTION OF THE PREFERRED EMBODIMENTS

Like characters of reference designate like parts in those figures of the drawings in which they occur.

In the drawings:

The reference numeral 10 indicates a conventional rotary power mower having a wheel supported handle operated carriage or frame 12 which includes a depending skirt 14 having a forwardly disposed lateral grass exit or vent 16. The mower 10 further includes a motor 18 mounted on the upper surface of the frame 12 which drives a vertical shaft 20 having a horizontally rotating blade 22 connected with its depending end within the limits of the depending skirt 14. The above description is conventional with most rotary power mowers and is set forth to show the combination with which the invention is to be used.

The reference numeral 25 indicates the edger and trimmer, as a whole, comprising a substantially U-shaped bracket having parallel horizontally disposed upper and lower legs or members 26 and 28 connected with a bight portion 30. An extension or arm 32, inverted L-shaped as viewed in FIG. 3, is integrally connected with the bracket legs 26, 28 and bight portion 30 and projects laterally of the U-shaped portion of the bracket. The leg portion of the L-shaped arm is provided with a plurality of small spaced-apart horizontal slots 34, adjacent its free end, for receiving bolts or screws 36 which extend through the mower skirt 14 and support the U-shaped portion of the bracket laterally of the grass vent 16 of the mower. The foot portion of the L-shaped extension overlies the adjacent upper edge surface of the mower frame 12 as a support for the trimmer and edger 25.

The horizontal legs 26 and 28 are vertically line drilled and bearings 38 are coaxially secured to the outer surfaces of the legs 26 and 28 which journal a vertical shaft 40. A belt pulley 42 is secured to the shaft 40 adjacent the inner surface of the upper leg 26. A second similar pulley 44, of a selected size, is mounted on the motor drive shaft 20 above the mower blade 22 and in alignment with the pulley 42 for receiving a V-belt 46 for driving the vertical shaft 40. A relatively small cutting blade 48 is horizontally secured, medially its ends, to the depending end of the vertical shaft 40.

The bracket bight portion 30 is transversely drilled and provided, on its opposing surfaces, with a pair of bearings 50 which horizontally journal a stub shaft 52 having its outermost end terminating outwardly of the outermost bearing 50 for receiving an edger blade 49 which is slightly longer than the trimming blade 48 for the reasons readily apparent. The inwardly disposed end of the stub shaft 52 terminates in spaced relation with respect to the vertical shaft 40. A pair of beveled gears 54 and 56 are cooperatively mounted, respectively, on the vertical shaft 40 and stub shaft 52 so that, as the vertical shaft 40 is rotated, the stub shaft 52 is also rotated. As a safety measure, the bracket leg 26 supports a guard 58.

Referring more particularly to FIGS. 5 and 6, the numerals 25A and 25B, respectively, indicate alternative configurations of the L-shaped bracket arm, indicated at 32A and 32B, respectively, which are shaped for connection with other configurations of the mower carriage or frame 12.

OPERATION

In operation the power mower blade 22 is removed and the pulley 44 installed on the drive shaft 20 and held in place by a set screw. Three holes are drilled in the forward depending portion of the skirt 14 for receiving the screws 36 and connecting the device 25 thereto. The belt 46 is entrained around the pulleys 42 and 44 and adjusted for tightness by movement of the bracket arm 32 permitted by the elongated slots 34. Thereafter the mower engine 18, when running, drives the trimming blade 48 for trimming lawn edges in areas where the main blade 22 will not reach. The edger blade 49, when secured to the stub shaft 52, is driven by the beveled gears 54 and 56 for edging the grass of a lawn, indicated at 60, adjacent a concrete walk 62, or the like.

I claim:

1. In combination with a rotary type mower having a frame defined, at its outer marginal edges, by a depending skirt, said skirt having a cut grass vent, said mower having a depending drive shaft supporting a rotary blade on the lower end thereof, the improvement comprising: bracket means connected with said skirt and projecting laterally of said frame adjacent said vent, said bracket means comprising a substantially U-shaped member having a vertically disposed bight portion spaced outwardly of said skirt and interconnecting parallel horizontally disposed legs having an arm portion extending between said U-shaped portion and said mower skirt; a vertical driven shaft; a horizontal stub shaft; a bracket bearing means journalling said vertical driven shaft and said horizontal stub shaft; means connecting said mower drive shaft with said vertical driven shaft; means connecting said vertical driven shaft with said horizontal stub shaft for driving the latter; and a cutting blade connected with one end of each of said vertical driven shaft and said horizontal stub shaft, respectively.

2. The mower as specified in claim 1 in which said bracket bearing means comprises a first pair of bearings connected, respectively, with the legs of said U-shaped member, and a second pair of bearings connected, respectively, to opposing sides of the bight portion of said U-shaped member.

3. The mower as specified in claim 2 in which the means connecting said mower drive shaft with said vertical driven shaft comprises: a pair of pulleys connected, respectively, with said mower drive shaft and said vertical driven shaft above the cutting blade; and a belt entrained around said pair of pulleys.

4. The mower as specified in claim 3 in which the means connecting said vertical driven shaft to said horizontal stub shaft comprises: a pair of beveled gears connected, respectively, to said vertical driven shaft and said stub shaft.

References Cited

UNITED STATES PATENTS

| 2,491,993 | 12/1949 | McClay | 56—256 |
| 2,719,400 | 10/1955 | Lesesne | 56—25.4 XR |
| 2,890,462 | 6/1959 | Smith et al. | 56—25.4 |
| 2,890,562 | 2/1966 | Porterfield | 56—25.4 |
| 3,319,406 | 5/1967 | Miles | 56—25.4 |

LOUIS G. MANCENE, Primary Examiner

J. A. OLIFF, Assistant Examiner

U.S. Cl. X.S.

56—255